(12) United States Patent
Loupia et al.

(10) Patent No.: US 7,739,697 B2
(45) Date of Patent: Jun. 15, 2010

(54) SYSTEM AND METHOD FOR CREATING WEB SERVICES FROM AN EXISTING WEB SITE

(75) Inventors: David Loupia, Carros (FR); Lionel Mommeja, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 11/300,866

(22) Filed: Dec. 15, 2005

(65) Prior Publication Data

US 2006/0155807 A1 Jul. 13, 2006

(30) Foreign Application Priority Data

Dec. 23, 2004 (EP) .................................. 04300943

(51) Int. Cl.
*G06F 3/00* (2006.01)
*G06F 7/00* (2006.01)
(52) U.S. Cl. ............................ 719/328; 707/1; 707/100

(58) Field of Classification Search ................. 719/328; 707/1, 100
See application file for complete search history.

(56) References Cited

U.S. PATENT DOCUMENTS

| 6,889,160 | B2 * | 5/2005 | Sabiers et al. ............... 702/122 |
| 7,058,645 | B2 * | 6/2006 | Seto et al. .................... 707/101 |
| 7,302,674 | B1 * | 11/2007 | Gladieux et al. ............ 717/101 |

* cited by examiner

*Primary Examiner*—Lechi Truong
(74) *Attorney, Agent, or Firm*—Andrea Bauer; Hoffman Warnick LLC

(57) ABSTRACT

Web services are generated from an existing web site having web page based business processes or transactions. A script is generated representative of a user navigation sequence involved to perform the transaction. The script elements include the web application calls, input/output parameters, and/or the interrelation between the elements of the transaction. A WSDL file, web service interface code, and web service implementation code are generated from the navigation script, and may be published locally to the web site or on a remote site.

11 Claims, 3 Drawing Sheets

SYSTEM AND METHOD FOR CREATING WEB SERVICES FROM AN EXISTING WEB SITE

FIELD OF THE INVENTION

This invention relates to web services technology, and more particularly to publishing web page based transactions as web services from an existing web application.

BACKGROUND OF THE INVENTION

Every year, more and more business is being transacted over the Internet. Business processes or transactions conducted over a network such as the Internet are typically implemented through web pages with software components, called web applications, enabling the transactions. Some enterprises having Internet sites with transactional capabilities offer business to customer (B2C) or business to business (B2B) communications.

B2C communication is described with reference to FIG. 1. Traditionally a user 16 conducts transactions on the Internet 12 with a web application interface 32 of the web application 18 as shown via the dashed arrows in FIG. 1. The user 16 typically accesses the transactions 22-24 of the web application 18 via the Internet 12 and the web application interface 32 through web pages of the web application 18. Web pages are typically written in hypertext markup language (HTML) for browsers on personal computers, wireless markup language (WML) for browsers on mobile phones, or the like. The web application 18 presents an interface to the user 16 by providing web pages, which the user 16 navigates to perform the transactions 22,24.

B2B communication is also described with reference to FIG. 1. For B2B communication, the web application on the server side must provide a programming interface to client applications. For this purpose, web services have been developed.

A web service is a software component that is well understood by a skilled person in the industry. The strength of web services is the standardized way to integrate various heterogeneous applications without prior knowledge of the specific implementation of each application. Web services allow different applications implemented in different sources to communicate by using a standardized description language such as Web Service Description Language (WSDL), simple object access protocol (SOAP), and universal description, discovery, and integration (UDDI). A WSDL file is a description language file written in extensible markup language (XML) that describes the functions and their associated input/ output parameters provided by the web service, which may be called by a user application (also called a web service client). The user application, before accessing the web service, reads the WSDL file and adapts its calls accordingly. The WSDL file may be stored on the same server as the server hosting the web service or in a different server or directory. Web services allow a programmatic access to distributed transactions over the Internet to provide data or functionality to another application.

However, creating, deploying and publishing web services to conduct transactions for web applications is complex and requires advanced programming skills. The amount of programming required is time intensive and the cost involved is substantial, for example, complex components such as application servers are typically required. Often, enterprises are not able to afford the expense associated with web services technology.

The current approach to build and deploy a web service 14 is shown in the computer network system 10 of FIG. 1. Such web services are typically programmed by the service provider or owner of the web application 18 and implemented on the same web server 26 hosting the web application 18. The web service 14 consists of two logical blocks, one for interfacing with the user application 20, i.e., the web service interface 28, and one for interfacing with the web application 18, i.e., the web service implementation 30. Knowledge of the web server 26 and web application language code allows the owner to program and deploy the web service interface 28 and web service implementation 30 that interacts directly with the code of the web application 18 to conduct the transactions 22-24. The web service interface 28 interacts with a user application 20 via a network, such as the Internet 12, to execute calls from the user application 20 and conduct the transactions 22-24 of the web application 18. The web service 14 interacts directly with the transactions via the web service implementation 30. Although advanced programming skills are required to implement the web service 14, this is a common technique of implementing web services that is well known in the art. The interrelation between user application 20, web application transactions 22-24, and web service 14 is shown via solid arrows in FIG. 1.

The main problems with previous approaches are that advanced programming skills are necessary and knowledge of the transaction interface of the web application is required to implement and deploy the web service. There is a need for a system and a method for generating web services that alleviates the problems associated with the previous approaches.

BRIEF SUMMARY OF THE INVENTION

It is an object of the invention to provide a system and method to develop a web service without having the knowledge of the web application transaction programming interface.

In accordance with the present invention, there is provided a method for generating a web service providing a programming interface between a web application and a user application, the method comprising: creating a script of a navigation flow of at least one transaction of the web application, the navigation flow representative of an interaction between a user and a web application interface of the web application during the at least one transaction; creating a text file describing a function and at least one of an input parameter or an output parameter, the function to be called by the user application for executing the at least one transaction; creating web service interface code corresponding to a call of the function as described in the text file; and creating web service implementation code for executing the interaction.

An embodiment creates a script of the navigation by recording the navigation flow of a human user conducting a transaction in the web application. The script of the navigation flow of the web service implementation code may be generated by a regression test tool. The script of the navigation flow may be written in script language. A text file is created taking the navigation flow script as input. The text file may be a WSDL file.

Another aspect of the invention provides a system for generating a web service providing a programming interface between a web application and a user application, the system comprising: means for creating a script of a navigation flow of at least one transaction of the web application, the navigation flow representative of an interaction between a user and a web application interface of the web application during the at least one transaction; means for creating a text file describing a function and at least one of an input parameter or an output parameter, the function to be called by the user application for executing the at least one transaction; means for creating web service interface code corresponding to the call of the function as described in the text file; and means for creating web service implementation code for executing the interaction.

In an embodiment, the text file may be generated by processing the script of the navigation flow which records of a human user conducting a transaction in the web application. The script of the navigation flow of the system web service implementation code may be generated by a regression test tool. The script of the navigation flow may be written in script language, and the text file may be a WSDL file. The web service may be implemented in a web server hosting the web application. In another embodiment, the web application may be hosted on a web server, and the web service may be hosted by another server.

Another aspect of the invention provides a program product stored on a computer-readable medium, which when executed, enables a computer system to generate a web service providing a programming interface between a web application and a user application, the program product comprising computer program code for enabling the computer system to: create a script of a navigation flow of at least one transaction of the web application, the navigation flow representative of an interaction between a user and a web application interface of the web application during the at least one transaction; create a text file describing a function and at least one of an input parameter or an output parameter, the function to be called by the user application for executing the at least one transaction; create web service interface code corresponding to a call of the function as described in the text file; and create web service implementation code for executing the interaction.

With the solution of an embodiment of the invention, a web service may be built without the knowledge of the transaction programming interface, which usually belongs to the web application owner. Consequently, a web service may be developed according to an embodiment of the invention by the client application owner or an Internet service provider.

Another advantage of the method of an embodiment of the invention is that the steps may be automated with the use of existing test tools and/or by writing a program product to create the WSDL file from a navigation flow and/or a program product to translate WSDL into a web service interface code, and/or a program product to create the web service implementation code from a navigation flow. All the program products may be written by a person skilled in the art without much difficulty to develop.

Finally, with the solution of an embodiment of the invention, a web application providing B2C communication to users may be enriched with this method for developing a web service providing a B2B communication to user applications.

BRIEF DESCRIPTION OF THE DRAWINGS

A system and method for generating a web page based process or transaction as a web service from a web site incorporating the present invention will now be described, by way of example only, with reference to the accompanying drawings, in which.

DETAILED DESCRIPTION OF THE INVENTION

Figure 1:
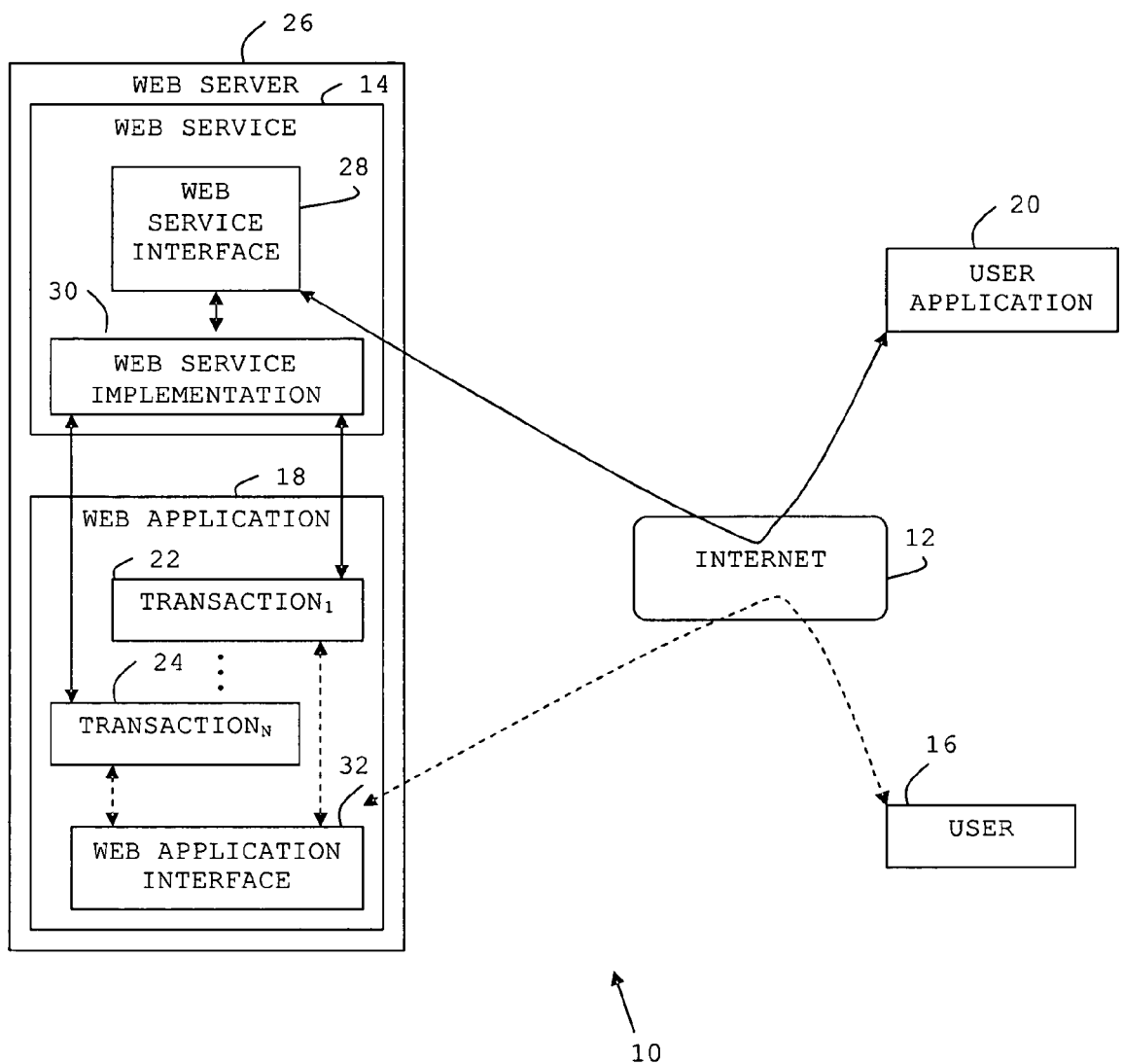
FIG. 1 shows a computer network system with a web service implementation according to the prior art.
Figure 2:
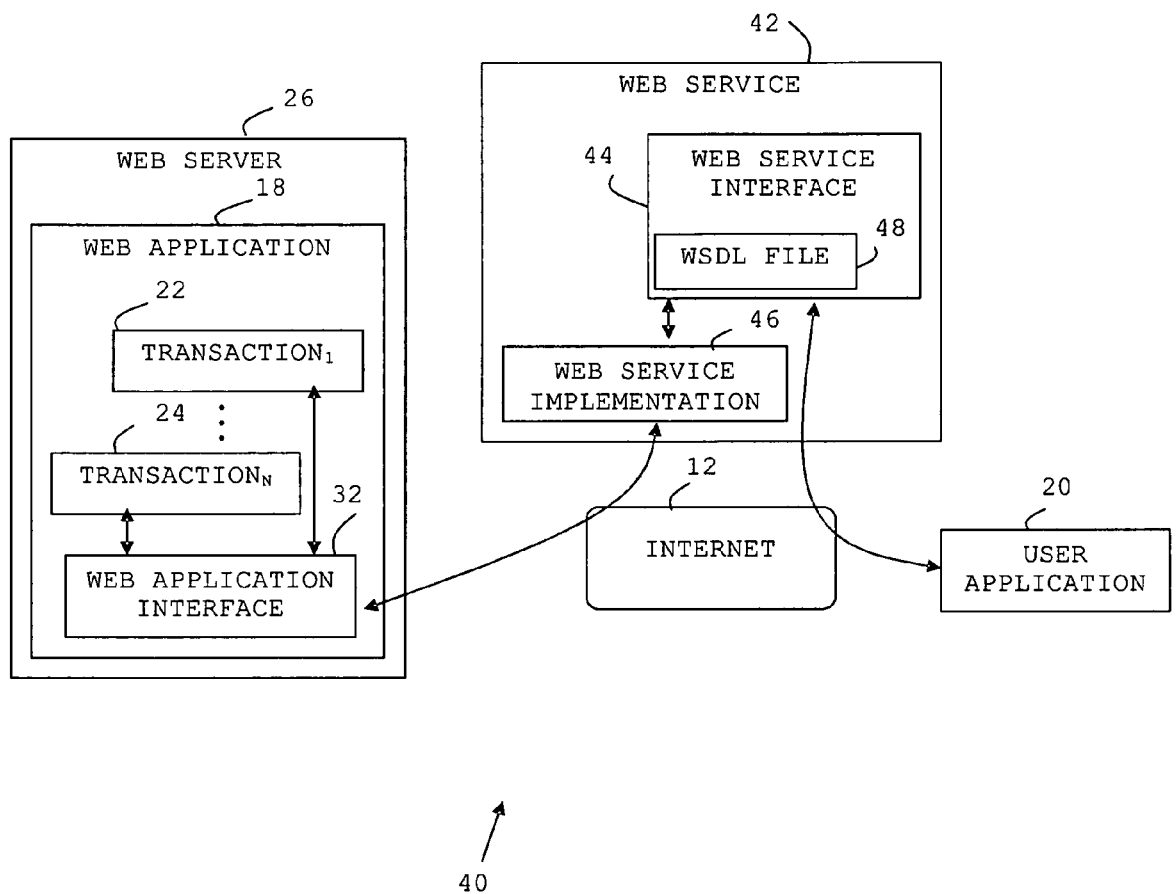
FIG. 2 shows a computer network system implementing an embodiment of the invention.

An embodiment of the invention may be implemented in the computer network 40 shown in FIG. 2. A web application 18 is implemented on a web server 26 or an external web site provider in a network such as the Internet 12. The web application 18 is implemented on the web server 26 with one of any number of platforms that are well known in the industry. A web server 26 may be configured to host one or more web applications 18. The web application 18 may be configured with at least one transaction$_{1-N}$ 22-24. Of course, it will be appreciated that transaction(s) 22-24 may include transactions as defined in the broadest sense, such as processes, retrieval of information, performance of a function, or the like, and is not taken to be limited to merely business transactions. A user application 20 may send calls for conducting the transaction(s) 22-24 of the web application 18 via the web service 42. The web service 42 may be created on the basis of an existing web application 18 without requiring any change to the existing web application interface 32. The web service 42 may be implemented on the web server 26 of the web application 18 or on another server separate or external from web server 26. A web service implementation 46 of the web service 42 of the preferred embodiment interacts with the web application 18 via the same web application interface 32 which is available to the user 16 (FIG. 1) of the web application 18.

In FIG. 2, in the web service 42 of an embodiment of the invention, the web service 42 interfaces and interacts with the web application 18 via the Internet 12 and the web application interface 32 of the web application 18. A user application 20 calls transactions 22-24 in the web application 18 of the web server 26 via a web service interface 44. A WSDL file 48 from the web service interface 44 of the web service 42 is initially read by the user application 20 before sending calls to the web service interface 44. The web service interface 44 receives the calls from the user application 20, and communicates the calls via web service implementation 46 across the network 12 to the web application interface 32 of the web application 18 to run the transactions 22-24. The web service implementation 46 calls the web application interface 32 and simulates the web page interactions which are made by a user running a transaction of the web application 18.

In an embodiment of the invention, the user application 20 acts as a web service client to perform a function such as a transaction 22-24 remotely. It will be appreciated that the client or user application 20 may interface or call one or more web services 42 via the Internet, however only one web service 42 is shown for illustrative purposes. The web service 42 or portions of the web service 42 may be generated manually or automatically, as discussed in further detail with reference to FIG. 3, from the existing web application 18 in order to allow connection from the client application. In another embodiment, the web service 42 may be hosted (not shown) by the same web server 26, or the web service 42 may be hosted by an external service provider.

Figure 3:
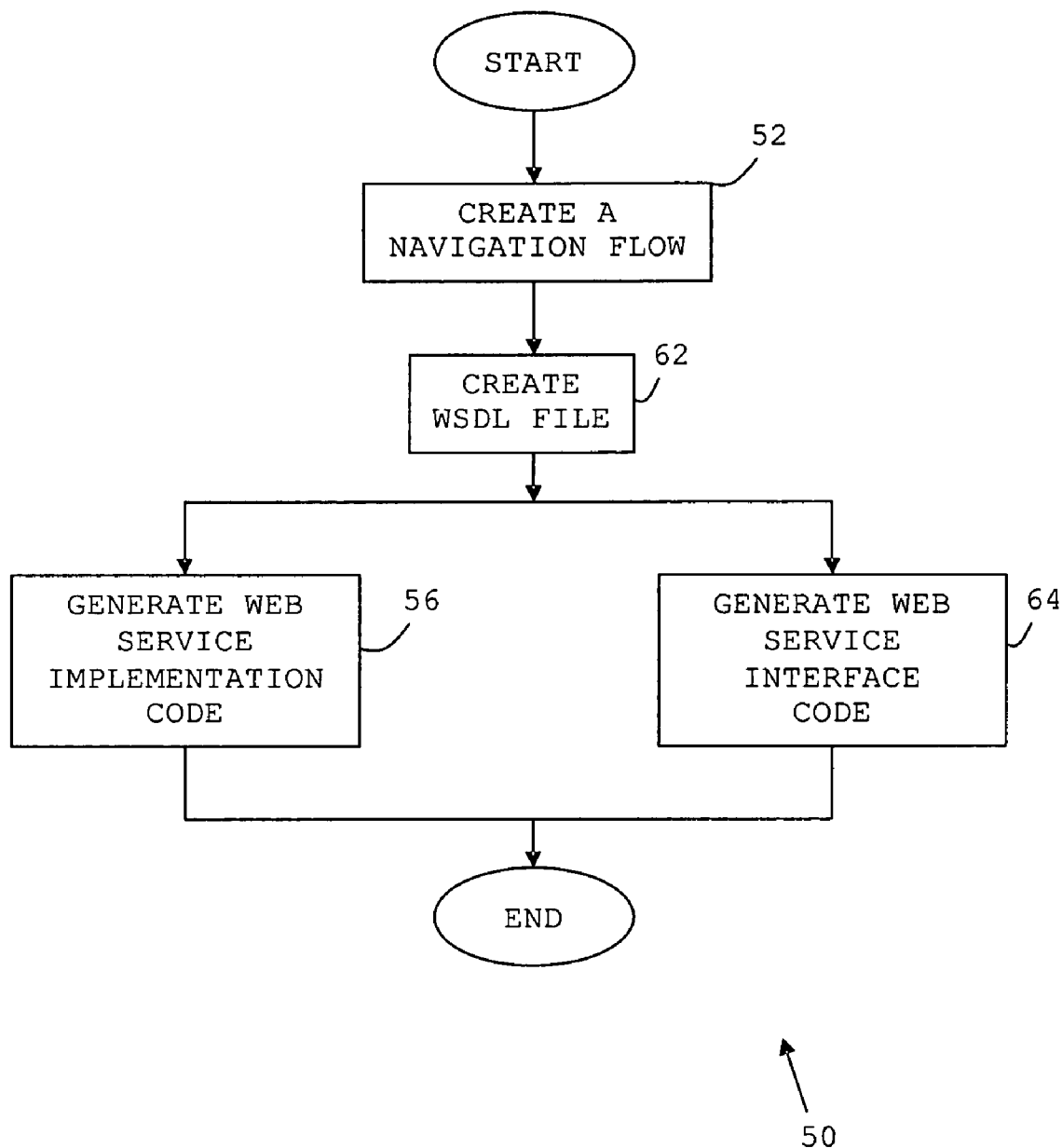
FIG. 3 shows a method in accordance with an embodiment of the invention.

An embodiment of the invention is shown as a method 50 in FIG. 3. The method is for the generation of web services from an existing web application having transactions. The web service comprises code having a module representative of the web service interface, and a module representative of the web service implementation. A navigation flow is first defined or created 52 to represent the web page interaction that the user activates while running a transaction. A script may be generated via a graphical user interface. Any other possible representation of the web page interaction forming the navigation flow may be used. The script may be stored in a memory (not shown) in the developer work station. The script may be defined in any format that captures and defines in detail the series of manual steps or interactions the client user conducts in the web pages of the web site for completing the transaction. A sample script generated from a user navigation of a web site to load a single page is:

Referring to FIGS. 2 and 3, the web service implementation code 46 and the web service interface code 44 are generated. The web service interface 44 and the web service implementation 46 may be generated in parallel as shown in FIG. 3 or in any other order. The web service implementation code is generated 56 from the navigation flow. The web service implementation code simulates the web page interac-

```
/* 1. Initial - Set Environment */
    lr_rendezvous("rendezvous_1"); /* Set rendezvous point */
    void lr_whoami(int FAR *vuser, LPCSTR FAR *vuser_group, int FAR *scid);
    LPCSTR my_host = lr_get_host_name( );
    LPCSTR my_controller = lr_get_master_host_name( );
    lr_save_datetime("Tomorrow is %B %d %Y", DATE_NOW + ONE_DAY, "next");
    lr_output_message(lr_eval_string("")));
/* 2. Actions */
    int lr_start_transaction(LPCSTR transaction_name); /* Begin Transaction */
    /* Note: LPCSTR prototype is automatically defined as char* */
        /* Command line parsing */
        lr_get_attrib_double
        lr_get_attrib_long
        lr_get_attrib_string(char *parml);
        void lr_peek_events( ); /* pause */
        void lr_think_time(int time); /* from 0 to 32.767 */
        /* Send data points to t_rep.eve6 event file for each Vuser */
            cpu_val=cpu_check( );
            lr_user_data_point("cpu",cpu_val);
            lr_user_data_point("data_point_1",1);
        /* Begin Negative testcase */
            lr_continue_on_error(1); /* 1=Continue when error occurs */
            int lr_advance_param(LPCSTR param); /* next */
        /* Check whether actual results are what was expected */
            /* Info about HTTP request */
            {
            int HttpRetCode, HttpRetSize, HttpRetTime;
            web_url("dogbert", "URL=http://dogbert", "TargetFrame=_TOP",
            LAST);
            HttpRetCode =
            web_get_int_property(HTTP_INFO_RETURN_CODE);
            if(HttpRetCode == 200)
                lr_log_message("The Vuser successfully accessed the
                page");
            else
                lr_log_message("The Vuser failed to access the page ");
            }
            HttpRetSize = web_get_int_property(HTTP_INFO_DOWNLOAD_SIZE);
            HttpRetTime = web_get_int_property(HTTP_INFO_DOWNLOAD_TIME);
            /* Verify other objects: */
            int web_find(char *FindName, , , LAST); /* text */
            int web_image_check(char *CheckName, , "alt=Alt", "src=Src",
            LAST);
            int web_java_check (char *Name, , "Classname=...", , LAST);
/* 3. End */
    int lr_end_transaction(LPCSTR transaction_name); /* Finish Transaction */
```

The above script is provided for illustrative purposes as having one web page interaction. An actual script would likely contain several interactions. Each transaction of the web application may be represented by such a script.

The script may be created manually, or in another embodiment, the script may be produced by a web site test tool such as IBM RATIONAL SUITE TESTSTUDIO (IBM, RATIONAL SUITE, and TESTSTUDIO are trademarks in certain countries of International Business Machines Corporation) available from International Business Machines Corporation, Armonk, N.Y., or LOADRUNNER (LOADRUNNER is a trademark of Mercury Interactive Corporation in certain countries) available from Mercury Interactive Corporation, Sunnyvale, Calif. The web service code may then be generated from the existing web application using the navigation flow stored as script files in the preferred embodiment.

tions for transactions 22-24. The web service implementation 46 interfaces or interacts with the web application interface 32.

In another embodiment, the web service implementation code may be generated automatically by a web site test tool, which generates regression tests such as IBM RATIONAL SUITE TESTSTUDIO. These tools create the code simulating the module for interaction between web pages. The web service implementation may be written in Java code, .net or the like.

To generate the web service interface code to interact and interface with client or user application 20, a WSDL file is created 62 from the navigation flow. The script is translated by a script translator into a programming language to describe web services, such as a WSDL file 48, for describing the function and the input and output parameters for each step of each transaction. For example, in one scenario, the function of the transaction may be ordering a book where input and output parameters may include book title, author name, international standard book number (ISBN), or the like. The process of translating may be achieved manually. A person skilled in the art may also develop a program translating script of the navigation flow to WSDL.

Once the navigation script is translated into a language, such as WSDL, to describe a web service function with its input and/or output parameter(s), the web service interface code is then generated 64. The web service interface code is generated from the WSDL file. The code may be any type of code that is compatible within the system environment, for example Java, net, or the like. The step of web service interface code generation may be also automated if a program is developed. A person skilled in the art may develop such a program translating WSDL into Java code or the like.

The web service implementation mainly consists of modules within the web service, for example, a module for calls to the functions with input and output parameters that are similar to the call registered in the generated script, and a module for code to simulate interactions within the web pages during the transaction.

It will be understood that the system and method for generating web services from an existing web application described above provides advantages, such as generation of web services from web-page based transactions. Another advantage is that the web service is generated based on the transaction conducted on web pages within a web site without express knowledge of the application. With this configuration, the generation and subsequent maintenance of the web service is less complex than previously achievable, and web page based transactions may be deployed as web services from an existing web application.

While shown and described herein as a method and system for generating web services from an existing web application, it is understood that the invention further provides various alternative embodiments. For example, in one embodiment, the invention provides a program product stored on a computer-readable medium, which when executed, enables a computer infrastructure to generate web services from an existing web application. To this extent, the computer-readable medium includes program code, which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), as a data signal traveling over a network (e.g., during a wired/wireless electronic distribution of the program product), and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as and application/software program, component software/a library of functions, an operating system, a basic I/O system/drive for a particular computing and/or I/O device, and the like. Further, it is understood that the term "system" represents any combination of hardware and/or software capable of performing some function(s).

It will be appreciated that specific embodiments of the invention are discussed for illustrative purposes, and various modifications may be made without departing from the scope of the invention as defined by the appended claims.

What is claimed is:

1. A method for generating a web service providing a programming interface between a web application and a user application, the method comprising:

creating and storing a script of a navigation flow of at least one transaction of the web application using at least one computing device, the navigation flow representative of an interaction between a user and a web application interface of the web application during the at least one transaction;

creating and storing a text file describing a function and at least one of an input parameter or an output parameter using the at least one computing device, the function to be called by the user application for executing the at least one transaction in the script of the navigation flow;

creating and storing web service interface code corresponding to a call of the function as described in the text file using the at least one computing device; and creating and storing web service implementation code for executing the interaction based on the script of the navigation flow using the at least one computing device, wherein the web service implementation code uses the web service interface code to implement the function without the user;

wherein the creating web service implementation code including generating the navigation flow using a regression test tool;

wherein the script of the navigation flow is written in a script language.

2. The method of claim 1, the creating a script including recording the navigation flow of a human user conducting a transaction in the web application.

3. The method of claim 1, wherein the text file is a Web Service Description Language (WSDL) file.

4. A computer system comprising:

at least one computer configured to, generate a web service providing a programming interface between a web application and a user application by:

creating a script of a navigation flow of at least one transaction of the web application, the navigation flow representative of an interaction between a user and a web application interface of the web application during the at least one transaction in the script of the navigation flow;

creating a text file describing a function and at least one of an input parameter or an output parameter, the function to be called by the user application for executing the at least one transaction;

creating web service interface code corresponding to the call of the function as described in the text file; and creating web service implementation code for executing the interaction based on the script of the navigation flow, wherein the web service implementation code uses the web service interface code to implement the function without the user;

wherein creating web service implementation code including generating the navigation flow using a regression test tool;

wherein the script of the navigation flow is written in a script language.

5. The system of claim 4, the creating a script including recording the navigation flow of a human user conducting a transaction in the web application.

6. The system of claim 4, wherein the text file is a Web Service Description Language (WSDL) file.

7. The system of claim 4, wherein the web service is implemented in a web server hosting the web application.

8. The system of claim 4, wherein the web application is hosted on a web server, and the web service is hosted by another server.

9. A program product stored on a computer-readable storage medium, which when executed, enables a computer system to generate a web service providing a programming interface between a web application and a user application, the program product comprising computer program code for enabling the computer system to:

create a script of a navigation flow of at least one transaction of the web application, the navigation flow representative of an interaction between a user and a web application interface of the web application during the at least one transaction in the script of the navigation flow;

create a text file describing a function and at least one of an input parameter or an output parameter, the function to be called by the user application for executing the at least one transaction;

create web service interface code corresponding to a call of the function as described in the text file; and create web service implementation code for executing the interaction based on the script of the navigation flow, wherein the web service implementation code uses the web service interface code to implement the function without the user;

wherein the computer program code for enabling the computer system to create web service implementation code including computer program code for enabling the computer system to generate the navigation flow using a regression test tool;

wherein the script of the navigation flow is written in a script language.

10. The program product of claim 9, the computer program code for enabling the computer system to create a script including computer program code for enabling the computer system to record the navigation flow of a human user conducting a transaction in the web application.

11. The program product of claim 9, wherein the text file is a Web Service Description Language (WSDL) file.

* * * * *